United States Patent
Roerig et al.

(10) Patent No.: US 10,589,382 B2
(45) Date of Patent: Mar. 17, 2020

(54) OVERLAPPING BORDER AND INTERNAL SECTIONS OF OBJECT FORMED BY DIFFERENT AM MELTING BEAM SOURCES IN OVERLAPPING FIELD REGION

(71) Applicant: General Electric Company, Schenectady, NY (US)

(72) Inventors: Felix Martin Gerhard Roerig, Baden (CH); Juan Vicente Haro Gonzalez, Zurich (CH)

(73) Assignee: General Electric Company, Schenectady, NY (US)

( * ) Notice: Subject to any disclaimer, the term of this patent is extended or adjusted under 35 U.S.C. 154(b) by 463 days.

(21) Appl. No.: 15/474,052

(22) Filed: Mar. 30, 2017

(65) Prior Publication Data

US 2018/0281112 A1 Oct. 4, 2018

(51) Int. Cl.
*B23K 26/342* (2014.01)
*B23K 15/00* (2006.01)
(Continued)

(52) U.S. Cl.
CPC .......... *B23K 26/342* (2015.10); *B22F 3/1055* (2013.01); *B22F 7/062* (2013.01); *B23K 15/0086* (2013.01); *B23K 26/0604* (2013.01); *B29C 64/153* (2017.08); *B29C 64/277* (2017.08); *B22F 2003/1056* (2013.01);
(Continued)

(58) Field of Classification Search
CPC .............. B23K 26/342; B23K 15/0086; B23K 10/027; B23K 9/04; B23K 9/042
See application file for complete search history.

(56) References Cited

U.S. PATENT DOCUMENTS

| 5,430,666 A | 7/1995 | DeAngelis et al. |
| 5,536,467 A | 7/1996 | Reichle et al. |

(Continued)

FOREIGN PATENT DOCUMENTS

| EP | 2875897 B1 | 1/2016 |
| WO | 2015040185 A1 | 3/2015 |

OTHER PUBLICATIONS

Final Office Action dated Mar. 20, 2018 for U.S. Appl. No. 15/001,607, filed Jan. 20, 2016; 21 pages.

(Continued)

*Primary Examiner* — Geoffrey S Evans
(74) *Attorney, Agent, or Firm* — Dale Davis; Hoffman Warnick LLC

(57) ABSTRACT

A method for additive manufacturing an object is disclosed. The method includes, for a first portion of the object to be built in a first overlapping field region of a plurality of melting beams of a metal powder AM system, sequentially forming each layer of the first portion by: forming only a border section of the first portion of the object using a first melting beam of the plurality of melting beams in the first overlapping field region; and forming an internal section of the first portion of the object within the border section using at least one second, different melting beam from the first melting beam in the first overlapping field region. An entirety of an internal edge of the border section of the first portion of the object is overlapped with an entirety of an external edge of the internal section of the first portion of the object.

12 Claims, 9 Drawing Sheets

(51) Int. Cl.
*B23K 9/04* (2006.01)
*B22F 3/105* (2006.01)
*B29C 64/153* (2017.01)
*B23K 26/06* (2014.01)
*B29C 64/277* (2017.01)
*B22F 7/06* (2006.01)
*B33Y 10/00* (2015.01)
*B33Y 30/00* (2015.01)
*B33Y 50/02* (2015.01)

(52) U.S. Cl.
CPC ... *B22F 2003/1057* (2013.01); *B22F 2999/00* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,985,204 | A | 11/1999 | Otsuka et al. |
| 2001/0003004 | A1 | 6/2001 | Leyden et al. |
| 2001/0051395 | A1 | 12/2001 | Grigg |
| 2009/0060386 | A1 | 3/2009 | Cooper et al. |
| 2010/0125356 | A1 | 5/2010 | Shkolnik et al. |
| 2010/0174392 | A1 | 7/2010 | Fink et al. |
| 2011/0220621 | A1 | 9/2011 | Pieger et al. |
| 2014/0255666 | A1 | 9/2014 | Stucker et al. |
| 2014/0348692 | A1 | 11/2014 | Bessac et al. |
| 2015/0004045 | A1 | 1/2015 | Ljungblad |
| 2015/0174827 | A1* | 6/2015 | Schwarze ............ B22F 3/1055 700/120 |
| 2016/0082668 | A1 | 3/2016 | Perret et al. |
| 2016/0082688 | A1* | 3/2016 | Nakai .................. B29C 39/148 428/141 |
| 2016/0114432 | A1* | 4/2016 | Ferrar .................. B22F 3/1055 219/76.12 |
| 2017/0173883 | A1* | 6/2017 | Gray ...................... B33Y 10/00 |
| 2018/0111219 | A1* | 4/2018 | Ackelid ................. B33Y 10/00 |

OTHER PUBLICATIONS

Extended European Search Report and Opinion issued in connection with corresponding EP Application No. 17151900.2 dated Jul. 10, 2017.

EOS M 400—3D Printing of Metal Parts on an Industrial Scale, EOS M 400 for Additive Manufacturing for the Industrial Production of High-Quality Large Metal Parts.—EOS. N.p., n.d. Web. Mar. 29, 2017. <https://www.eos.info/systems_solutions/metal/systems_equipment/eos_m_400>.

SLM 280 Metal Additive Manufacturing System, Multiple Lasers for Demanding Applications Ideal for Volume Production and Large Prototype Applications—SLM Solutions, N.p., n.d. Web. Mar. 29, 2017. <http://slm-solutions.us/slm-280hl/>.

SLM 500 Selective Laser Melting System Highlights, Up to 2800W Laser Power for Demanding Applications Additive Manufacturing with up to Four Lasers for High-Volume Production,—SLM Solutions, N.p., n.d. Web. Mar. 29, 2017. <http://slm-solutions.us/slm-500hl/>.

U.S. Appl. No. 15/001,607, Office Action 1 dated Mar. 23, 2017, 21 pages.

U.S. Appl. No. 15/001,607, Office Action 2 dated Oct. 5, 2017, 19 pages.

Notice of Allowance dated Jun. 27, 2018 for U.S. Appl. No. 15/001,607, filed Jan. 20, 2016; 13 pages.

* cited by examiner

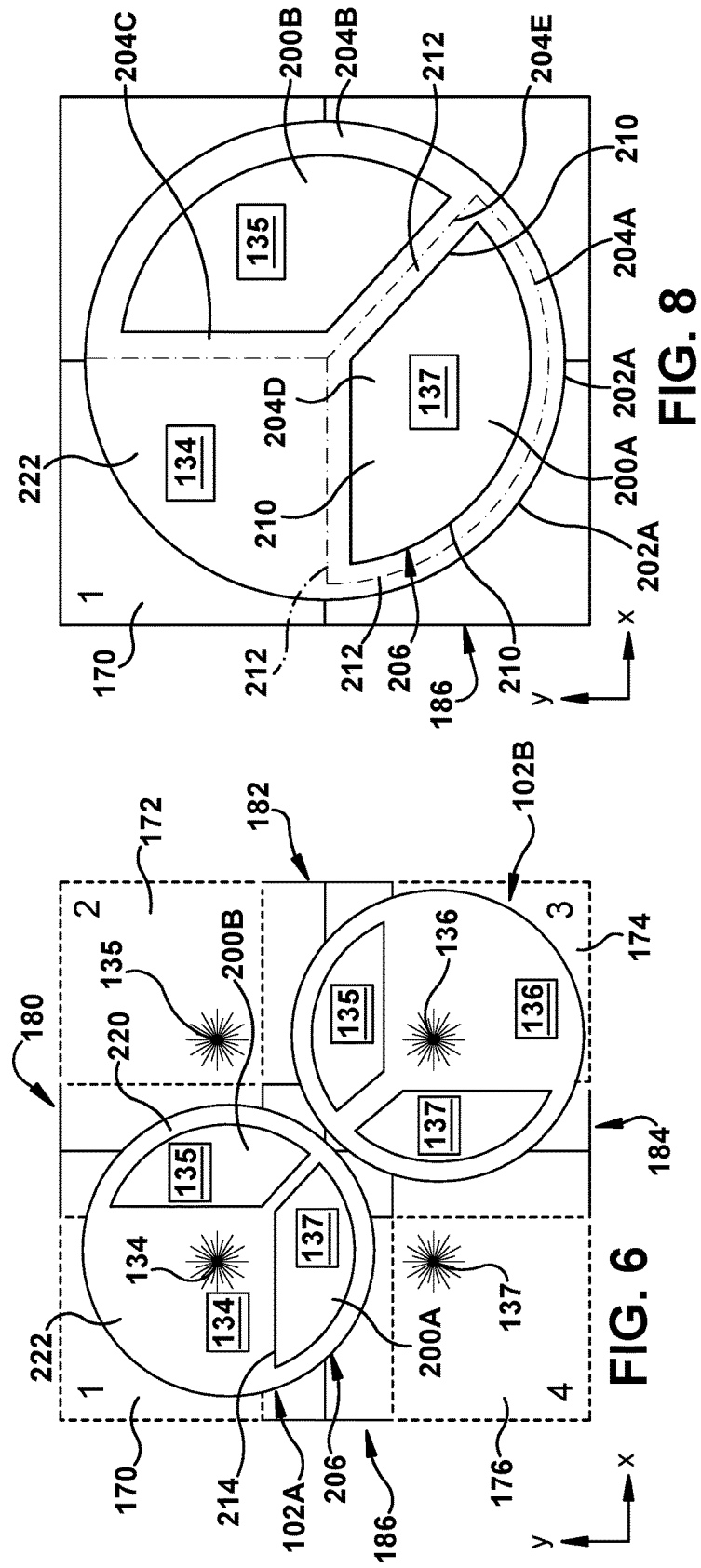
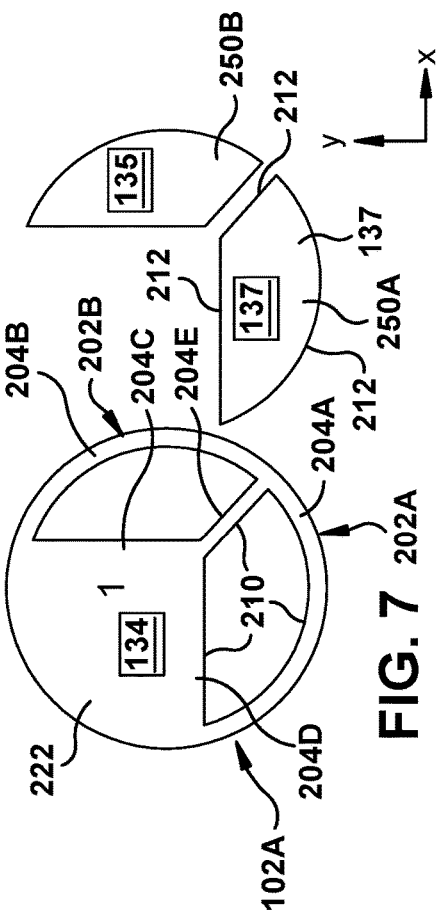

OVERLAPPING BORDER AND INTERNAL SECTIONS OF OBJECT FORMED BY DIFFERENT AM MELTING BEAM SOURCES IN OVERLAPPING FIELD REGION

BACKGROUND OF THE INVENTION

The disclosure relates generally to additive manufacturing, and more particularly, to methods and systems for metal powder additive manufacturing a portion of an object using different melting beam sources in an overlapping field region of the sources and including overlapping border and internal sections of the portion.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, and creating a file with a two-dimensional image of each layer. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed to create the object.

In metal powder additive manufacturing techniques, such as selective laser melting (SLM) and direct metal laser melting (DMLM), metal powder layers are sequentially melted together to form the object. More specifically, fine metal powder layers are sequentially melted after being uniformly distributed using an applicator on a metal powder bed. The metal powder bed can be moved in a vertical axis. The process takes place in a processing chamber having a precisely controlled atmosphere of inert gas, e.g., argon or nitrogen. Once each layer is created, each two dimensional slice of the object geometry can be fused by selectively melting the metal powder. The melting may be performed by, for example, a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed is lowered for each subsequent two dimensional layer, and the process repeats until the object is completely formed.

In order to create more objects faster or create larger objects, some metal additive manufacturing systems employ numerous high powered melting beam sources, e.g., four lasers, that work together to form numerous objects or a larger object. For speed, some of these systems employ techniques that form a shell of an object with one melting beam source using a small beam size, and a core of the object with another melting beam source using a larger beam size that melts material adjacent to the shell. Further, for speed or source balancing reasons, some of these systems employ techniques that form a portion of an object with one melting beam source, and at least a second portion with a second melting beam source that melts material adjacent thereto. In either event, the melting beams sources must be precisely aligned to ensure defects do not occur where the two melting beam sources work in adjacent areas.

BRIEF DESCRIPTION OF THE INVENTION

A first aspect of the disclosure provides a method for additive manufacturing an object, the method comprising: for a first portion of the object to be built in a first overlapping field region of a plurality of melting beams of a metal powder additive manufacturing system, sequentially forming each layer of the first portion by: forming only a border section of the first portion of the object using a first melting beam of the plurality of melting beams in the first overlapping field region; and forming an internal section of the first portion of the object within the border section using at least one second, different melting beam from the first melting beam in the first overlapping field region, wherein at least one of the forming steps includes overlapping an entirety of an internal edge of the border section of the first portion of the object with an entirety of an external edge of the internal section of the first portion of the object.

A second aspect of the disclosure provides a multiple melting beam source, metal powder additive manufacturing (AM) system for additive manufacturing an object, the system comprising: a metal powder additive manufacturing printer including a plurality of melting beam sources for creating a respective plurality of melting beams; and a control system configured to direct operation of the plurality of melting beam sources to: for a first portion of the object to be built in a first overlapping field region of the plurality of melting beams, sequentially form each layer of the first portion by: forming only a border section of the first portion of the object using a first melting beam of the plurality of melting beams in the first overlapping field region; and forming an internal section of the first portion of the object within the border section using at least one second, different melting beam from the first melting beam in the first overlapping field region, wherein at least one of the forming steps includes overlapping an entirety of an internal edge of the border section of the first portion of the object with an entirety of an external edge of the internal section of the first portion of the object.

A third aspect of the disclosure provides a non-transitory computer readable storage medium storing code representative of an object, the object physically generated upon execution of the code by a computerized metal powder, multiple melting beam source, additive manufacturing system, the code comprising: code representing a first portion of the object to be built in a first overlapping field region of a plurality of melting beam sources of the additive manufacturing system, the code for the first portion including: a border section of the first portion of the object to be built using a first melting beam source of the plurality of melting beam sources in the first overlapping field region; an internal section of the first portion of the object within the border section to be built using at least one second, different melting beam source from the first melting beam source in the first overlapping field region; and wherein the code overlaps an entirety of an internal edge of the border section of the first portion of the object with an entirety of an external edge of the internal section of the first portion of the object.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6 shows a schematic plan view of a four melting beam additive manufacturing system building a pair of objects in overlapping field regions according to embodiments of the disclosure.

FIG. 7 shows an exploded, schematic plan view of a layer of one object formed by the system from FIG. 6 illustrating a border section and internal sections formed in an overlapping field region according to embodiments of the disclosure.

FIG. 8 shows an enlarged, schematic plan view of a layer of one object formed by the system from FIG. 6 illustrating the overlapping border and internal sections formed in an overlapping field region according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a metal powder additive manufacturing system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single component may include and be referenced in another context as consisting of multiple components. Alternatively, what may be described herein as including multiple components may be referred to elsewhere as a single component.

As indicated above, the disclosure provides methods and a metal powder additive manufacturing (AM) system that employ multiple melting beams to create more objects faster or create larger objects. As used herein, "melting beam source," or "source" for short, may refer to: any form of melting beam originating structure such as a laser scanner or electron beam electromagnetic coil, or any form of device that creates a number of melting beams from a single beam, e.g., a beam separator, mirror, etc. In any event, the melting beam is capable of forming a melt pool of metal powder in an additive manufacturing setting. Depending on the design of the object and the number of objects in one build job, object(s) may have to be produced by more than one melting beam source. Embodiments of the disclosure provide a technique to address melting beam source misalignment relative to an object made by more than one melting beam. The number of melting beam sources used by any metal powder additive manufacturing system may vary, e.g., two, three, four, etc.

Figure 1:
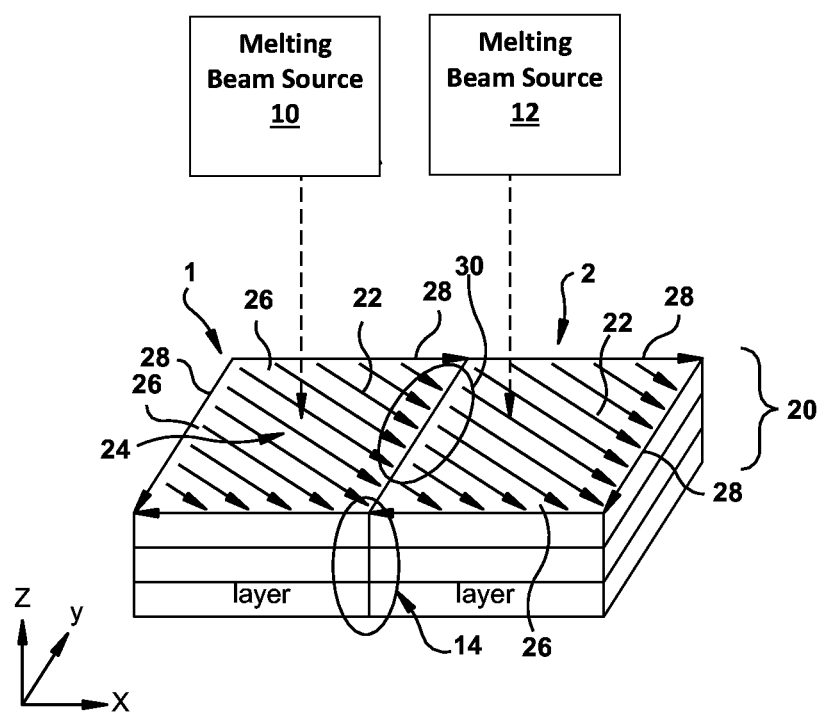
FIG. 1 shows a schematic perspective view of a conventional two melting beam additive manufacturing system building an object.

FIG. 1 shows a schematic perspective view of melting beams of an additive manufacturing system using two adjacent melting beam sources 10, 12, e.g., lasers. During operation, the melting beam(s) (dashed lines) are guided, e.g., by scanner mirrors, along scan vectors (paths), which are indicated by arrows on a top surface of illustrative object 20. Internal scan vectors 22 melt inner regions 24 of object 20 that scan linearly across a layer, and a very thin border 26 is melted with one to three contour scan vectors 28 that only follow a desired outer edge of the layer. Here, border 26, as created exclusively by contour scan vectors 28, is always along a perimeter of object 20, and internal scan vectors 22 only create inner regions 24 within border 26. Where more than one laser 10, 12 is used to make a single object, each has its own field (1 and 2, respectively) upon which it can work. As used herein, "field" indicates an area of melt powder within which a particular melting beam source can create a melt pool of a metal powder layer, i.e., an areal range of the particular source. Each melting beam source 10, 12 works within only a small portion of its respective field at any given time. Each field and the scan vectors are assigned to one or the other source 10, 12 with a split line 30 (within circle) indicating a line of demarcation of the fields. Which scan vector is made by which source usually depends on the region that can be reached by each source.

Figure 2:
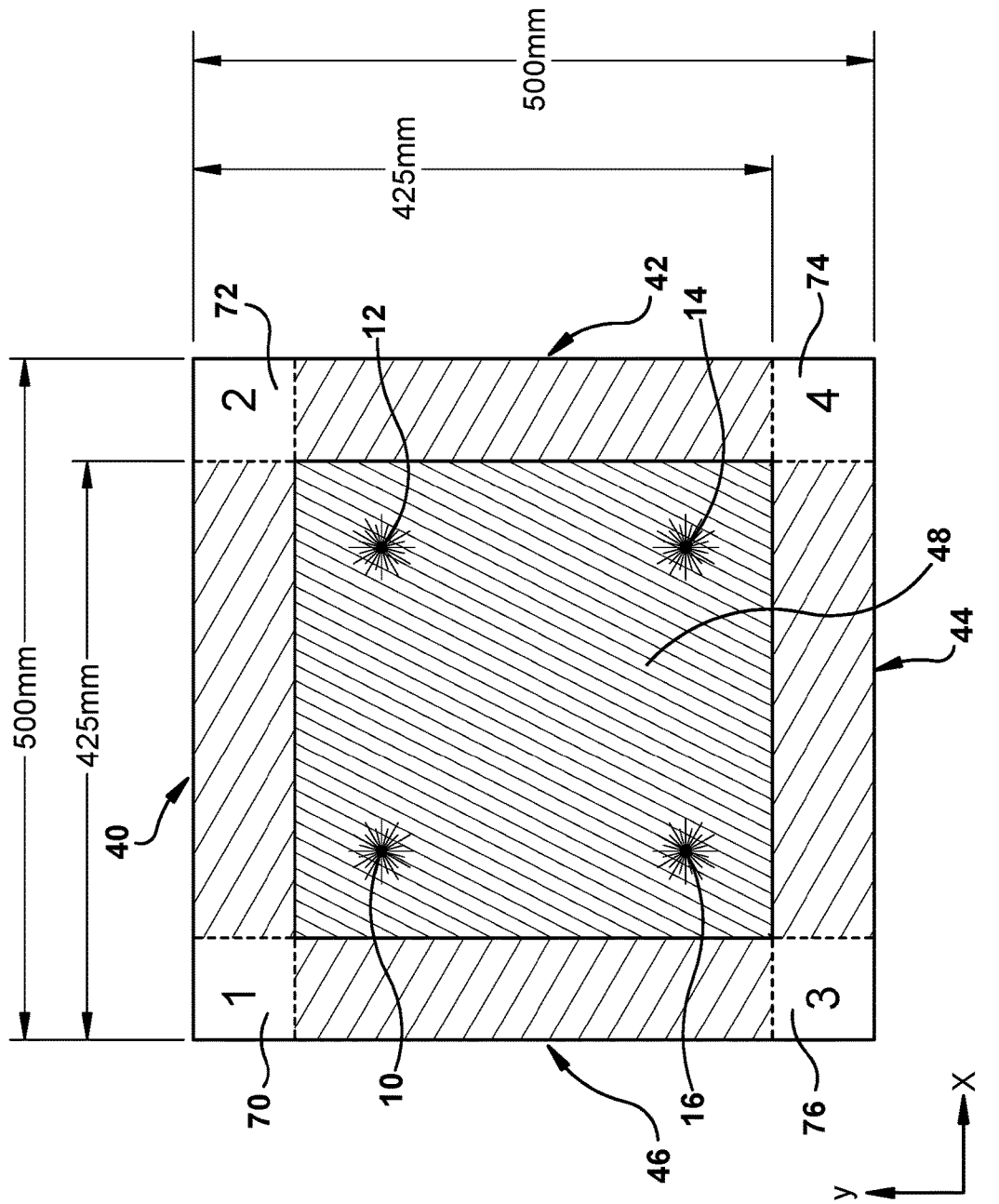
FIG. 2 shows a schematic plan view of respective fields of a conventional four melting beam additive manufacturing system.

FIG. 2 shows a schematic plan view of melting beam source fields of an additive manufacturing system that employs four melting beam sources 10, 12, 14, 16, e.g., lasers or electron beam sources. As shown in FIG. 2, each melting beam source 10, 12, 14, 16 has a respective field 1, 2, 3 4 upon which it can create a melt pool on the metal powder on a build platform. Each melting beam source 10, 12, 14, 16 is shown centered over its respective field, but this may not be necessary in all instances. Each melting beam source 10, 12, 14, 16 works within only a small portion of its field 1, 2, 3, 4, respectively, at any given time. In FIG. 2, the total metal powder build platform area is, for example, 500 millimeters (mm) by 500 mm. Each melting beam source however has a field that is 425 mm by 425 mm, e.g., see dimension lines for field 1 of source 10. Here, adjacent fields overlap. An "overlapping field region" or "overlap region" of fields indicates an area in which more than one melting beam source can create a melt pool. In FIG. 2, for example, each field may have a 350 mm overlap region with an adjacent field as follows: region 40 for sources 10 and 12; region 42 for sources 12 and 14; region 44 for sources 14 and 16; and region 46 for sources 10 and 16. A 350 mm by a 350 mm square overlap region 48 exists in the center that is covered by each melting beam source 10, 12, 14, 16. A "non-overlapping field region" indicates an area in which only one melting beam source can create a melt pool. In FIG. 2, field 1 includes non-overlapping field region 70 of melting beam source 10, field 2 includes non-overlapping field region 72 of melting beam source 12, field 3 includes non-overlapping field region 74 of melting beam source 14, and field 4 includes non-overlapping field region 76 of melting beam source 16. Here, each non-overlapping region is 75 mm by 75 mm. It is emphasized that FIG. 2 is but one example of an arrangement of overlapping melting beams, and various other options may exist with different sized fields and overlapping regions. In another option, each field may completely overlap each other field so the entire build platform is an overlapping region.

Figure 3:
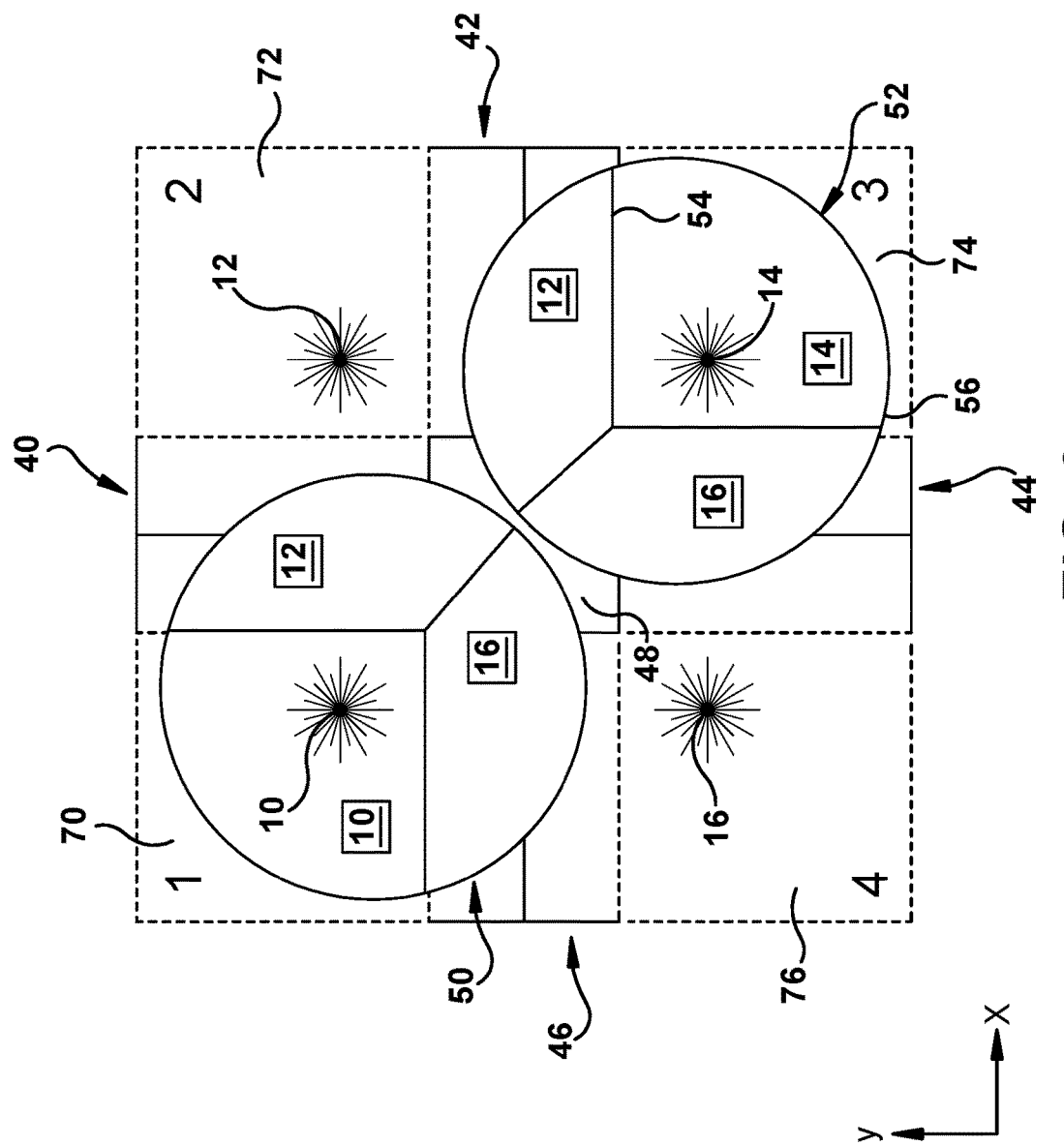
FIG. 3 shows a schematic plan view of the four melting beam additive manufacturing system of FIG. 2 building a pair of objects in overlapping field regions.

FIG. 3 shows the schematic plan view of FIG. 2 with a layer of two objects 50, 52 being formed by melting sources 10, 12, 14, 16, which are shown centered over their respective fields 1, 2, 3, 4. While objects 50, 52 are shown as circular, it is understood they can be any shape. Sections of each object 50, 52 formed by a respective melting source are labeled with the reference number of melting source 10, 12, 14, 16 which builds it in a box. As indicated, object 50 may be formed by: source 10 in non-overlapping region 70 of field 1, source 12 in overlapping field region 40, and source 16 in overlapping field region 46. Similarly, object 52 may be formed by: source 14 in non-overlapping region 74 in field 3, source 12 in overlapping field region 42, and source 16 in overlapping field region 44. With reference to object 52, in each overlapping field region, melting beam sources are conventionally configured to have their vectors align exactly to generate a dense microstructure internally (e.g., at internal mating surfaces noted by line 54), and an object without a step on the outer surface (e.g., at edge 56 where surfaces mate). In this case, a portion of object 52 that are built by more than one source are separated along a fixed split line, e.g., line 54, and every source melts the corresponding portion of object 52 cross section on its side of the split line.

Figure 4C:
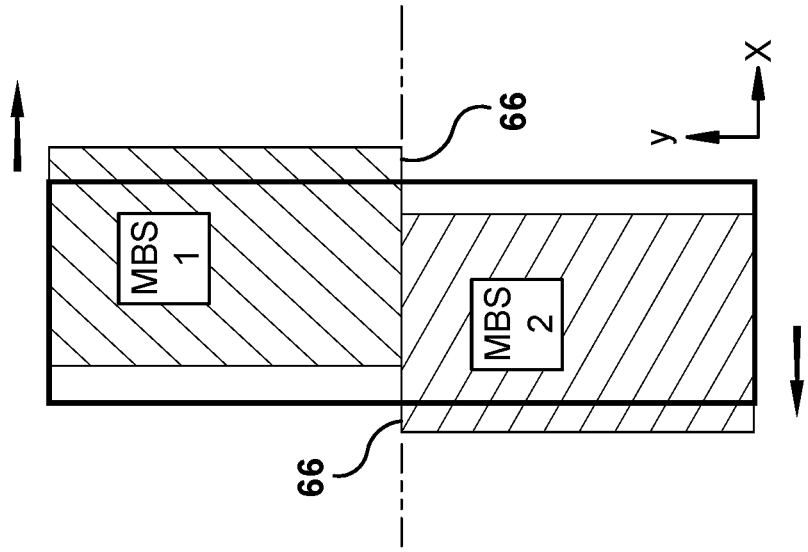
FIGS. 4A-C show schematic plan views of melting beam misalignment issues of multiple melting beam additive manufacturing systems.
Figure 4B:
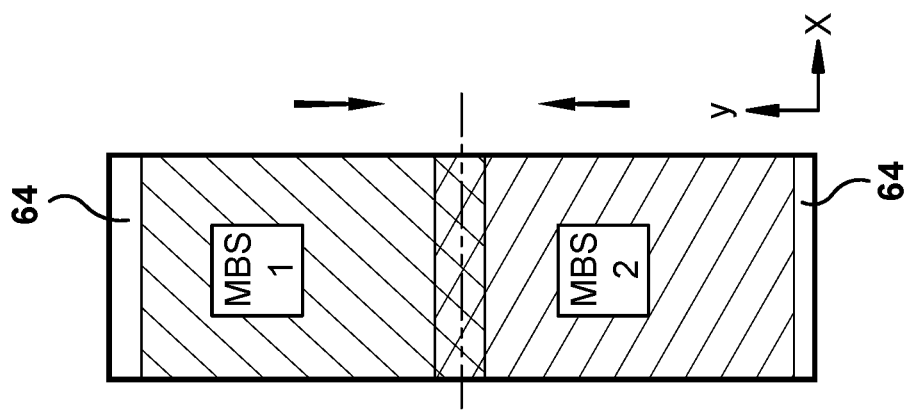
Figure 4A:
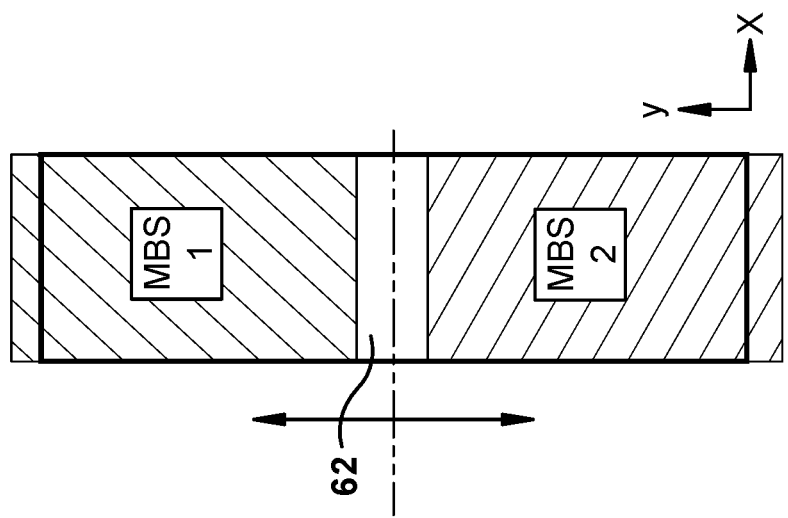

Conventionally, within overlapping field regions, fields may be configured to overlap slightly (e.g., 0.5 millimeters) in either an X or a Y direction to compensate for misalignment between the melting beam sources in one of those directions. To illustrate, FIGS. 4A-C show intended object shapes with solid outer lines, possible misalignment issues, and their related defects of two melting beam sources (MBS1 and MBS2). For example, FIG. 4A shows a Y-direction shift separating fields that creates a defect area 62. Defect areas 62 would include such defects as pores or other forms of insufficient melting, i.e., where MBS1 and/or MBS2 do not create a melt pool. FIG. 4B shows an overlapping Y-direction shift that creates defect area(s) 64. Defect areas 64 indicate areas where the object is built too small, i.e., where MBS1 and/or MBS2 do not create a melt pool to the desired shape. In contrast, FIG. 4C shows an X-direction shift, which can create defect areas 66 observed as misaligned or stepped surfaces, or surface roughness. The overlap region in the Y-direction in, for example FIG. 4B, can be used to compensate for some Y-direction shift. However, when the Y-direction shift of FIG. 4A occurs, or the X-direction shift occurs, or both X and Y direction shifts occur together, there is currently no way to adequately compensate for the situation. (It is noted that while shown in a particular X-Y arrangement, all of the defects illustrated can occur in the Y direction or the X direction.)

The alignment of multiple melting beam sources depends on the stability of the hardware and the calibration of all sources with respect to each other. However, both hardware and calibration are subjected to shift and error. The shift between melting beam sources can be created by a number of factors such as but not limited to: thermal drift, manufacturing and assembly tolerances, mechanical drift, and alignment tolerances. Embodiments of the disclosure provide a strategy which allocates the work of multiple melting beam sources by separating a portion of an object to be built in an overlapping field region into an outer, border section and one or more internal, embedded sections within the border section. The outer, border section is molten by a single melting beam source, whereas the inner, embedded region is molten by at least one different source. The internal and border sections include an overlap section along an entirety of their mating edges, i.e., in the X-direction and the Y-direction. Consequently, compensation for shifts can occur in both X and Y directions, avoiding the defects described relative to FIGS. 4A-C.

Figure 5:
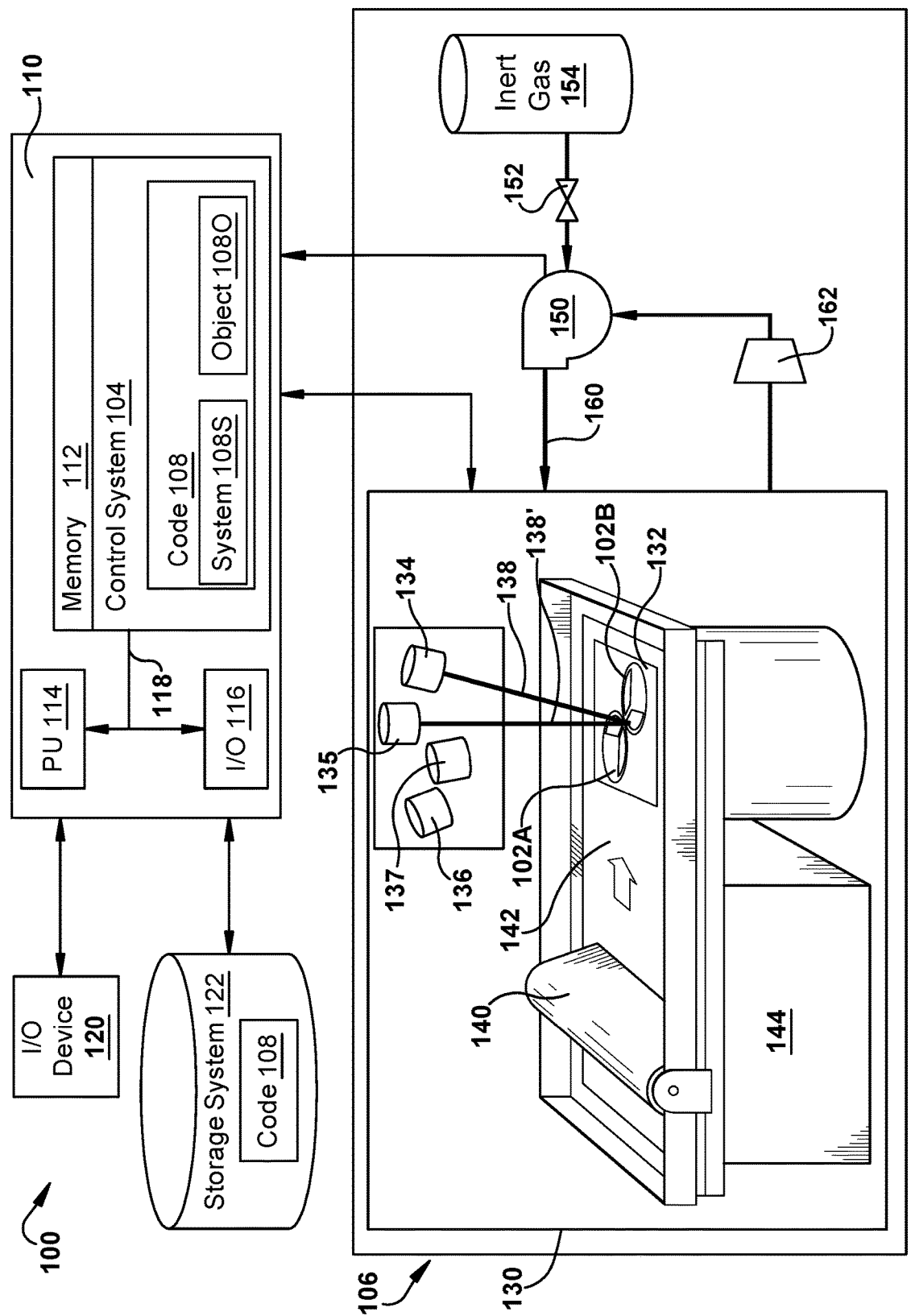
FIG. 5 shows a block diagram of a multiple melting beam additive manufacturing system, including a non-transitory computer readable storage medium storing code representative of an object, according to embodiments of the disclosure.

FIG. 5 shows a schematic/block view of an illustrative computerized metal powder additive manufacturing system 100 (hereinafter 'AM system 100') for generating one large object 102 or multiple objects 102A, 102B (shown), of which only a single layer is shown. The teachings of the disclosures will be described relative to building an object 102A, B using multiple melting beam sources 134, 135, 136, 137, but it is emphasized and will be readily recognized that the teachings of the disclosure are equally applicable to build multiple objects 102A, 102B using multiple melting beam sources 134, 135, 136, 137. In this example, AM system 100 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing. Objects 102A, 102B are illustrated as circular elements; however, it is understood that the additive manufacturing process can be readily adapted to manufacture any shaped object, a large variety of objects and a large number of objects on build platform 132.

AM system 100 generally includes a metal powder additive manufacturing control system 104 ("control system") and an AM printer 106. As will be described, control system 104 executes set of computer-executable instructions or code 108 to generate object 102 using multiple melting beam sources 134, 135, 136, 137. In the example shown, four melting beam sources may include four lasers. However, the teachings of the disclosures are applicable to any melting beam source, e.g., an electron beam, laser, etc. Control system 104 is shown implemented on computer 110 as computer program code. To this extent, computer 110 is shown including a memory 112 and/or storage system 122, a processor unit (PU) 114, an input/output (I/O) interface 116, and a bus 118. Further, computer 110 is shown in communication with an external I/O device/resource 120 and a storage system 122. In general, processor unit (PU) 114 executes computer program code 108 that is stored in memory 112 and/or storage system 122. While executing computer program code 108, processor unit (PU) 114 can read and/or write data to/from memory 112, storage system 122, I/O device 120 and/or AM printer 106. Bus 118 provides a communication link between each of the components in computer 110, and I/O device 120 can comprise any device that enables a user to interact with computer 110 (e.g., keyboard, pointing device, display, etc.). Computer 110 is only representative of various possible combinations of hardware and software. For example, processor unit (PU) 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of non-transitory computer readable storage medium including magnetic media, optical media, random access memory (RAM), read only memory (ROM), etc. Computer 110 can comprise any type of computing device such as an industrial controller, a network server, a desktop computer, a laptop, a handheld device, etc.

As noted, AM system 100 and, in particular control system 104, executes code 108 to generate object 102. Code 108 can include, inter alia, a set of computer-executable instructions 108S (herein also referred to as 'code 108S') for operating AM printer 106, and a set of computer-executable instructions 108O (herein also referred to as 'code 108O') defining object 102 to be physically generated by AM printer 106. As described herein, additive manufacturing processes begin with a non-transitory computer readable storage medium (e.g., memory 112, storage system 122, etc.) storing code 108. Set of computer-executable instructions 108S for operating AM printer 106 may include any now known or later developed software code capable of operating AM printer 106.

Set of computer-executable instructions 108O defining object 102 may include a precisely defined 3D model of an object and can be generated from any of a large variety of well-known computer aided design (CAD) software systems such as AutoCAD®, TurboCAD®, DesignCAD 3D Max, etc. In this regard, code 108O can include any now known or later developed file format. Furthermore, code 108O representative of object 102 may be translated between different formats. For example, code 108O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 108O representative of object 102 may also be converted into a set of data signals and transmitted, received as a set of data signals and converted to code, stored, etc., as necessary. Code 108O may be configured according to embodiments of the disclosure to allow for formation of border and internal sections in overlapping field regions, as will be described. In any event, code 108O may be an input to AM system 100 and may come from a part designer, an intellectual property (IP) provider, a design company, the operator or owner of AM system 100, or from other sources. In any event, control system 104 executes code 108S and 108O, dividing object 102 into a series of thin slices that assembles using AM printer 106 in successive layers of material.

AM printer 106 may include a processing chamber 130 that is sealed to provide a controlled atmosphere for object 102 printing. A build platform 132, upon which object 102 is/are built, is positioned within processing chamber 130. A number of melting beam sources 134, 135, 136, 137 are configured to melt layers of metal powder on build platform 132 to generate object 102. While four melting beam sources 134, 135, 136, 137 will be described herein, it is emphasized that the teachings of the disclosure are applicable to a system employing any number of sources, e.g., 2, 3, or 5 or more. As shown in the schematic plan view of FIG. 6, each melting beam source 134, 135, 136, 137 has a field 1, 2, 3 or 4 including a non-overlapping field region 170, 172, 174, 176, respectively, in which it can exclusively melt metal powder, and at least one overlapping field region 180, 182, 184, 186 in which two or more sources can melt metal powder. In this regard, each melting beam source 134, 135, 136, 137 may generate a melting beam (two shown, 138, 138', in FIG. 5), respectively, that fuses particles for each slice, as defined by code 108O. For example, in FIG. 5, melting beam source 134 is shown creating a layer of object 102 using melting beam 138 in one region, while melting beam source 136 is shown creating a layer of object 102 using melting beam 138' in another region. Each melting beam source 134, 135, 136, 137 is calibrated in any now known or later developed manner. That is, each melting beam source 134, 135, 136, 137 has had its laser or electron beam's anticipated position relative to build platform 132 correlated with its actual position in order to provide an individual position correction (not shown) to ensure its individual accuracy. In one embodiment, each of plurality melting beam sources 134, 135, 136, 137 may create melting beams, e.g., 138, 138' (FIG. 5), having the same cross-sectional dimensions (e.g., shape and size in operation), power and scan speed.

Referring to FIG. 5, an applicator 140 may create a thin layer of raw material 142 spread out as the blank canvas from which each successive slice of the final object will be created. Various parts of AM printer 106 may move to accommodate the addition of each new layer, e.g., a build platform 132 may lower and/or chamber 130 and/or applicator 140 may rise after each layer. The process may use different raw materials in the form of fine-grain metal powder, a stock of which may be held in a chamber 144 accessible by applicator 140. In the instant case, object 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc.

Processing chamber 130 is filled with an inert gas such as argon or nitrogen and controlled to minimize or eliminate oxygen. Control system 104 is configured to control a flow of a gas mixture 160 within processing chamber 130 from a source of inert gas 154. In this case, control system 104 may control a pump 150, and/or a flow valve system 152 for inert gas to control the content of gas mixture 160. Flow valve system 152 may include one or more computer controllable valves, flow sensors, temperature sensors, pressure sensors, etc., capable of precisely controlling flow of the particular gas. Pump 150 may be provided with or without valve system 152. Where pump 150 is omitted, inert gas may simply enter a conduit or manifold prior to introduction to processing chamber 130. Source of inert gas 154 may take the form of any conventional source for the material contained therein, e.g. a tank, reservoir or other source. Any sensors (not shown) required to measure gas mixture 160 may be provided. Gas mixture 160 may be filtered using a filter 162 in a conventional manner.

In operation, build platform 132 with metal powder thereon is provided within processing chamber 130, and control system 104 controls flow of gas mixture 160 within processing chamber 130 from source of inert gas 154. Control system 104 also controls AM printer 106, and in particular, applicator 140 and melting beam sources 134, 135, 136, 137 to sequentially melt layers of metal powder on build platform 132 to generate object 102 according to embodiments of the disclosure.

Referring to FIGS. 6-8, embodiments of an operational method for additive manufacturing object 102 with AM system 100 will now be described. FIG. 6 shows schematic plan view of respective fields of a four melting beam AM system 100 (FIG. 5); FIG. 7 shows an exploded, schematic plan view of sections of an illustrative object 102A from FIG. 6; and FIG. 8 shows an enlarged, schematic plan view of object 102A from FIG. 6 illustrating object overlap sections as will be described herein. As shown in FIG. 6, an illustrative object 102A may be formed by: melting beam source 134 in non-overlapping region 170 in field 1, melting beam source 135 in overlapping field region 180, and melting beam source 137 in overlapping field region 186. Similarly, object 102B may be formed by: melting beam source 136 in non-overlapping field region 174 in field 3, melting beam source 135 in overlapping field region 182, and melting beam source 137 in overlapping field region 184. With reference to object 102A, for example, and as shown in the exploded, schematic plan view in FIG. 7, in accordance with embodiments of the disclosure, each object may include one or more internal sections (two shown, 200A, 200B) and a border section 202 (202A about internal section 200A, and 200B about internal section 200B) formed in an overlapping region, e.g., 186 (FIG. 6), for multiple melting beam sources 134, 137. Herein, each border section 202A, 202B may be referenced by sub-sections, e.g., sub-sections 204A, 204D and 204E extend about internal section 200A, and sub-sections 204B, 204C and 204E extend about internal section 200B. As used herein, "border section" indicates a section of a layer of an object 102 formed by a melting beam source that includes not just those sections created by contour scan vectors for a desired outer edge of an object, but also internal scan vectors forming sections of the layer of the object inwardly of the desired outer edge of the object. As used herein, "internal sections" indicate a section of a layer of an object 102 formed by a melting beam source that includes only internal scan vectors, which follow a certain pattern that is not related to the contour of the object. Collectively, internal section 200A and border section 202A thereabout (e.g., sub-sections 204A, D and E) represent a first portion 206 (FIGS. 6 and 8) of object 102A built in overlapping field region 186 of plurality of melting beam sources, e.g., 134, 137, of metal powder AM system 100 (FIG. 5). As shown best in the enlarged, schematic plan view of FIG. 8, in contrast to conventional techniques, an entirety of an internal edge 210 (FIG. 7) of border section 202A of first portion 206 (FIGS. 6 and 8) of object 102A overlaps with an entirety of an external edge 212 of internal section 200A of first portion 206 (FIGS. 6 and 8) of object 102A. An overlap section 214 (FIG. 6) is thus created between an entirety of each border section and an internal section it surrounds. A similar overlap section is created for each internal section 200 with a respective border section 202 within each overlapping region. While only one internal section 200 is shown in each overlapping region, any number may be formed.

For first portion 206 in overlapping region 186, object 102A may be formed by sequentially forming each layer of first portion 206 by: forming only border section 202A of first portion 206 of object 102A using a first melting beam source 134 of plurality of melting beam sources 134, 135, 136, 137 in first overlapping field region 186, and forming an internal section 200A of first portion 206 (FIGS. 6 and 8) of object 102A within border section 202A using at least one second, different melting beam source 137 from first melting beam source 134 in first overlapping field region 186. Here, at least one of the forming steps (i.e., the latter occurring) includes overlapping an entirety of internal edge 210 of border section 202A of first portion 206 (FIGS. 6 and 8) of object 102A with an entirety of external edge 212 of internal section 200A of first portion 206 (FIGS. 6 and 8) of object 102A. That is, melting beam sources 134, 137 create an overlap section 214 of an entirety of edges 210, 212 of internal section 200A and border section 202A, respectively.

As also shown in FIGS. 6-8, the above-described methodology can be repeated for any number of portions of object 102A within overlapping regions 180, 182, 184, 186 of multiple melting beam sources 134, 135, 136, 137. For example, as shown in FIGS. 6 and 7, for a second portion 220 (FIG. 6) of object 102A to be built in a second overlapping field region 180 (different than overlapping region 186) of plurality of melting beam sources 134, 135, 136, 137, second portion 220 may be formed by sequentially forming each layer thereof similar to first portion 206. That is, AM system 100 may form only a border section 202B (sub-sections 204B, 204C, 204E) of second portion 220 of object 102A using first melting beam source 134 in second overlapping field region 180, and may form internal section 200B of second portion 220 of object 102A within border section 202B using a third melting beam source 135 different than first melting beam source 134 and second melting beam source 137 in second overlapping field region 180. Here again, at least one of the forming steps (i.e., the latter occurring) includes overlapping an entirety of internal edge 210 of border section 202B of second portion 220 (FIG. 6) of object 102A with an entirety of external edge 212 of internal section 200B of second portion 220 (FIG. 6) of object 102A. That is, again, melting beam sources 134, 135 create an overlap section 214 of edges 210, 212 of internal section 200A and 200B and border section 202A, 202B, respectively.

As shown in FIG. 7, sub-sections 204C and 204D of border sections 202A, 202B, respectively, create overlapping scan vectors and space internal sections 200A, 200B, respectively, relative to an outer extent of each overlapping field in which the internal sections are generated. More specifically, sub-section 204C creates overlapping scan vectors and spaces internal section 200B from an outer extent of field 2 of melting beam source 135, and sub-section 204D creates overlapping scan vectors and spaces internal section 200A from an outer extent of field 4 of melting beam source 137. The overlapping scan vectors that create border sub-sections 204C, 204D allow for compensation of misalignment of melting beam sources 135, 137 within the range of the overlapping scan vectors. Further, since border sections 202 exist about an entirety of internal sections 200, overlapping of scan vectors in the X direction and the Y direction are created, rather than just in one or the other direction. Consequently, misalignment within the range of overlap can be addressed to avoid defects relative to X and/or Y direction shifts in the melting beam sources.

In addition to the above portions of object 102A, portion(s) of object 102A, e.g., a third portion 222, may be built in a non-overlapping field region 170 of a selected melting beam source, e.g., 134. That is, AM system 100 may sequentially form layers of third portion 222 exclusively using selected melting beam source 134 in non-overlapping field region 170.

The above-described methodology can be used simultaneously to build any number of objects 102 on build platform 132 (FIG. 5). In FIG. 6, for example, another object 102B may be built simultaneously with object 102A.

In addition to the above-described methodology, control system 104 of AM system 100 may also load balance use of plurality of melting beam sources 134, 135, 136, 137 within overlapping region(s) 180, 182, 184, 186, and within any particular layer. That is, AM system 100 may balance the duration each melting beam source is employed. Melting beam sources 134, 135, 136, 137 may be load balanced within each layer using any now known or later developed strategy.

Figure 9:
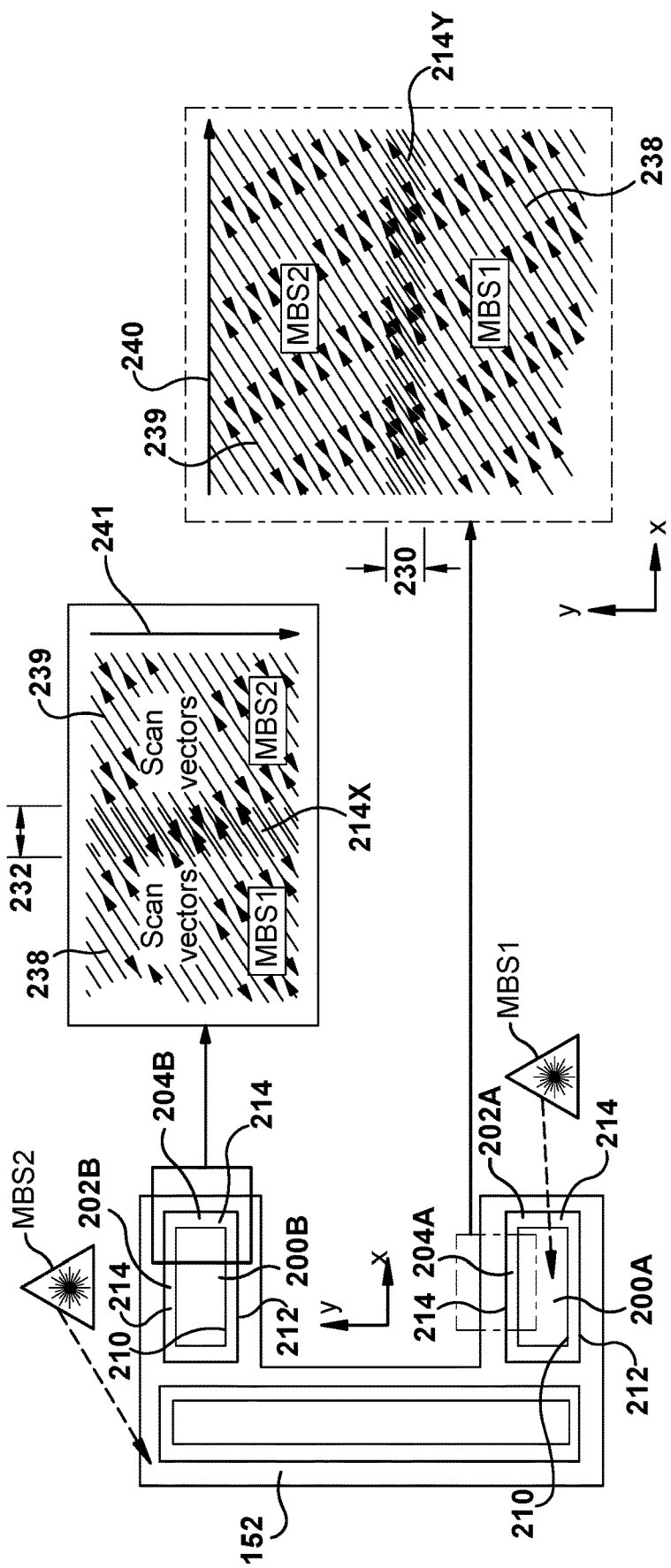
FIG. 9 shows a schematic plan view of another object and melting beam scan vectors thereof according to embodiments of the disclosure.

FIG. 9 shows a schematic plan view of an object shaped differently than objects 102A, 102B in FIGS. 6-8. Object 102 has, for example, border sections 202A, 202B and internal sections 204A, 204B that include overlap sections 214 along an entirety of their mating internal edge 210 and external edge 212. FIG. 9 shows object 102 formed by a first multiple beam source (MBS1) and a second multiple beam source (MBS2). In this example, MBS1 creates only internal scan vectors 238 to create internal sections 200, and MBS2 creates internal scan vectors 239 and contour scan vectors 241 to form border sections 202. Consequently, MBS1 creates internal sections 200A, 200B; MBS2 creates border sections 202A, 202B using many internal scan vectors 238 and one to three contour scan vectors 239 along an outer edge of object 102; and both MBS1 and MBS2 may create overlap sections 214. FIG. 9 shows how an overlap section 214Y in a Y-direction in an overlapping region between, for example, border section 202A and internal section 200A, e.g., at sub-section 204A, can be used to compensate for Y-direction misalignment 230. FIG. 9 also shows how an overlap section 214X in an X-direction in an overlapping region between, for example, border section 202B and internal section 200B, e.g., at sub-section 204B, can be used to compensate for X-direction misalignment 232.

Figure 11:
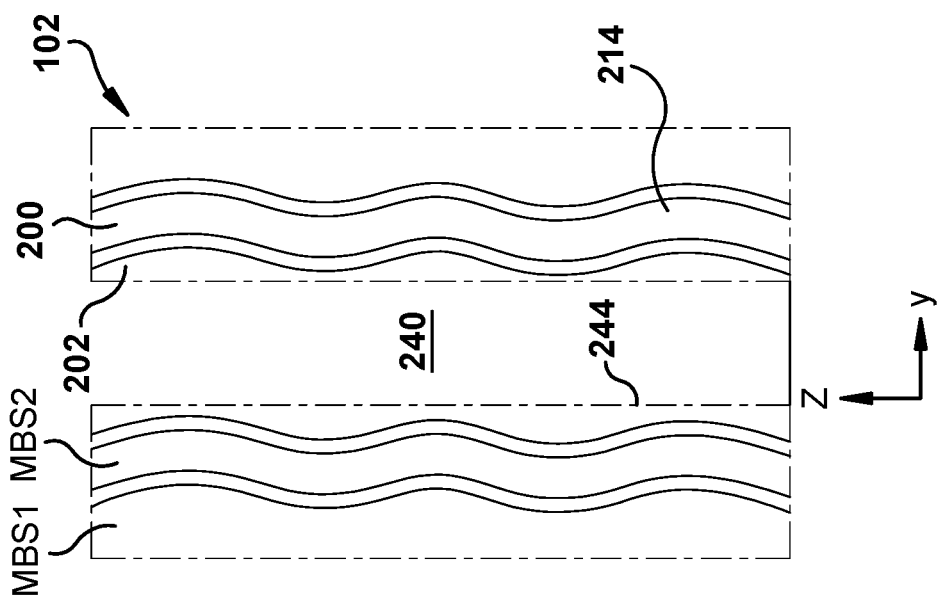
FIG. 11 shows an enlarged, cross-sectional view of the object of FIG. 10 including a void formed according to embodiments of the disclosure.
Figure 10:
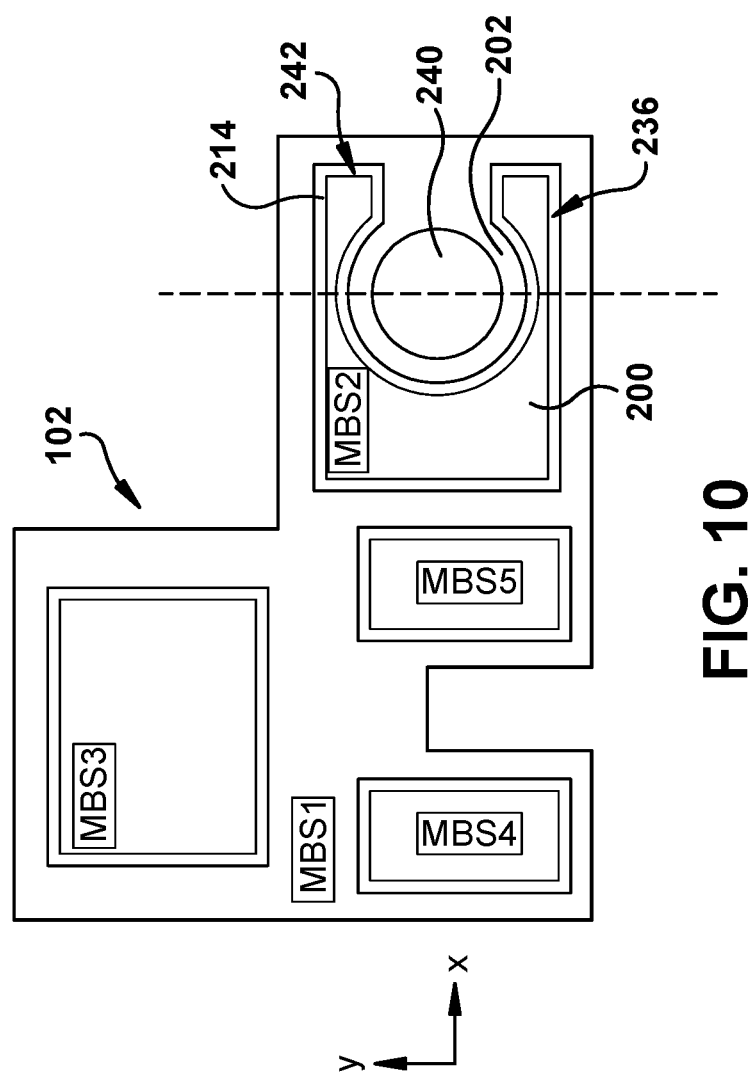
FIG. 10 shows a schematic plan view of another object including a void formed according to embodiments of the disclosure.

FIG. 10 shows a schematic plan view and FIG. 11 shows an enlarged, cross-sectional view of an object 102 formed according to embodiments of the disclosure. In this embodiment, object 102 includes an internal section 200 of a first portion 236 that includes a void 240. Void 240 may take any form such as but not limited to: an opening, passage, channel, etc. Here, void 240 includes a passage such as a cooling passage in a metal object 102. Internal section 200 of portion 236 of object 102 is formed in an overlapping region 242 of a first melting beam source MBS1 and a second melting beam source MBS2. According to embodiments of the disclosure, forming border section 202 includes forming void 240 using one of the melting beams, i.e., from melting beam source MBS1 or MBS2. In this fashion, as shown in FIG. 10, void 240, regardless off its form, can be created using only one melting beam source, e.g., MBS1, rather than trying to align two melting beams as is conventional. As shown in the enlarged, cross-sectional view of FIG. 11, void 240 has a smooth interior surface 244, free of stepped or rough surfaces. Smooth interior surface 244 would be difficult to generate using multiple melting beam sources without overlapping internal and border sections.

Figure 13:
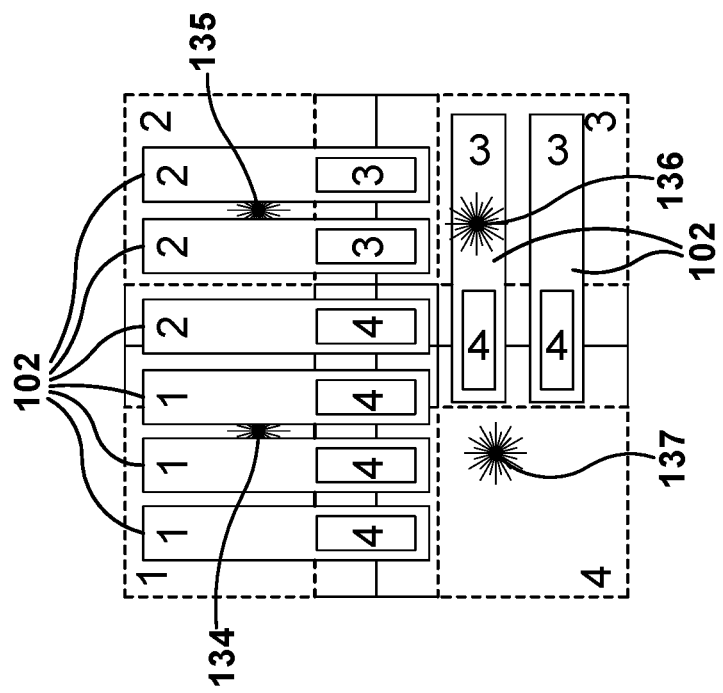
FIGS. 12 and 13 show schematic plan views of examples of other objects formed according to embodiments of the disclosure.
Figure 12:
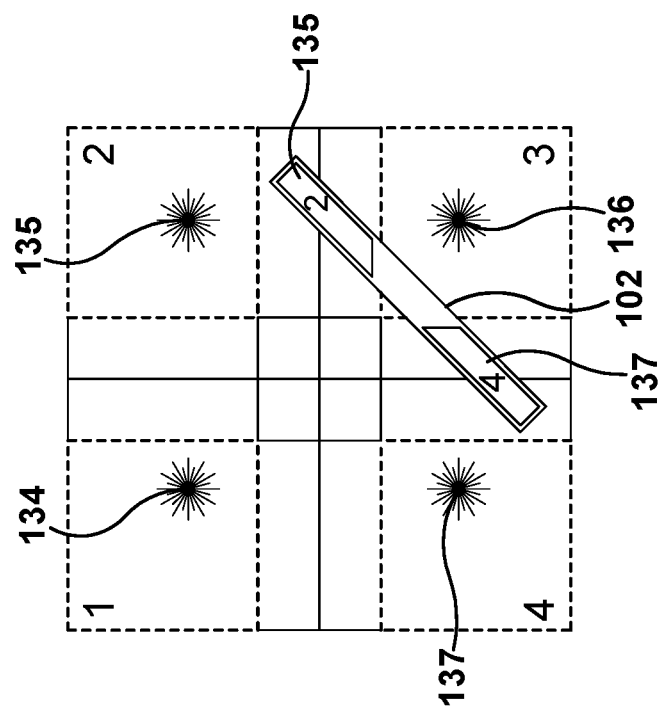

FIGS. 12 and 13 show schematic, plan views of additional examples of objects 102 that can be formed according to embodiments of the disclosure. As indicated, objects 102 can take on practically any shape, and employ teachings of the disclosure.

Returning to FIG. 5, embodiments of the disclosure include multiple melting beam source, metal powder AM system 100 for additive manufacturing object 102. As noted, AM system 100 includes a metal powder additive manufacturing printer 106 including plurality of melting beam sources 134, 135, 136, 137 for creating respective plurality of melting beams 138, 138'. Control system 104 of AM system 100 is configured to direct operation of plurality of melting beam sources 134, 135, 136, 137 to carry out the sequential forming of layers of portions of object 102, as described herein.

Embodiments of the disclosure may also include a non-transitory computer readable storage medium storing code 108O representative of object 102, the object physically generated upon execution of the code by a computerized metal powder, multiple melting beam source AM system 100. As illustrated in FIG. 6, code 108O may include code representing, for example, first portion 206 of object 102A to be built in overlapping field region 186 of plurality of melting beam sources 134, 135, 136, 137 of AM system 100. Code 108O for first portion 206 may include: a border section 202 of first portion 206 of object 102A to be built using first melting beam source 134 of plurality of melting beam sources 134, 135, 136, 137 in first overlapping field region 186. Further, code 108O may include internal section 200A of first portion 206 within border section 202 to be built using at least one second, different melting beam source 137 from first melting beam source 134 in first overlapping field region 186. As noted, code 108A overlaps an entirety of an internal edge 210 of border section 202A of first portion 206 with an entirety of an external edge 212 of internal section 200A of first portion 206. Code 108O may also include a second portion 220 to be built in a second overlapping field region 180 of the plurality of melting beam sources. Code 108O for second portion 220 may include: border section 202B to be built using first melting beam source 134 in second overlapping field region 180, and internal section 200B of second portion 220 within border section 202B to be built using a third melting beam source 135 different than first melting beam source 134 and second melting beam source 137 in second overlapping field region 180. Code 108O may also include third portion 222 to be built in a non-overlapping field region 170 of a selected melting beam source 134.

The methodology, AM system 100 and code 108O described herein have the technical effect of providing better quality objects 102 in a manner that is just as fast as conventional approaches. Further, they provide increased quality due to the reduced risk of defects related to misalignment of melting beam sources. Further, they provide quicker machine setup and reduced need for alignment calibration due to the more robust beam allocation provided by the overlapping border and internal sections, e.g., during the DMLM process. The objects created also exhibit increased quality due to better mechanical interlocking of regions processed by several melting beam sources. Where a void is provided in an object, embodiments of the disclosure provide increased quality by producing the void using only one melting beam source to avoid stepped or rough surfaces. Where, for example, the void is a cooling passage in an object, the smoother internal surface may aid in avoiding reduced cooling flow due to melting beam source misalignment.

It should be noted that in some alternative implementations, the acts noted may occur out of the order described or, for example, may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for additive manufacturing an object, the method comprising:
   for a first portion of the object to be built in a first overlapping field region of a plurality of melting beams of a metal powder additive manufacturing system, sequentially forming each layer of the first portion by:
   forming only a border section of the first portion of the object using a first melting beam of the plurality of melting beams in the first overlapping field region; and
   forming an internal section of the first portion of the object within the border section using at least one second, different melting beam from the first melting beam in the first overlapping field region,
   wherein at least one of the forming steps includes overlapping an entirety of an internal edge of the border section of the first portion of the object with an entirety of an external edge of the internal section of the first portion of the object.

2. The method of claim 1, wherein for a second portion of the object to be built in a second overlapping field region of the plurality of melting beams, sequentially forming each layer of the second portion by:
   forming only a border section of the second portion of the object using the first melting beam of the plurality of melting beams in the second overlapping field region; and
   forming an internal section of the second portion of the object within the border section using a third melting beam different than the first melting beam and the second melting beam in the second overlapping field region.

3. The method of claim 2, wherein for a third portion of the object to be built in a non-overlapping field region of a selected melting beam of the plurality of melting beams, sequentially forming layers of the third portion exclusively using the selected melting beam in the non-overlapping field region.

4. The method of claim 1, further comprising for a second portion of the object to be built in a non-overlapping field region of a selected melting beam of the plurality of melting beams, sequentially forming layers of the second portion exclusively using the selected melting beam in the non-overlapping field region.

5. The method of claim 1, further comprising load balancing use of the plurality of melting beam sources within each layer.

6. The method of claim 1, wherein each of the plurality melting beams have the same cross-sectional dimensions, power and scan speed.

7. The method of claim 1, further comprising simultaneously forming more than one object.

8. The method of claim 1, wherein both of the forming steps includes overlapping an entirety of an internal edge of the border section of the first portion of the object with an entirety of an external edge of the internal section of the first portion of the object.

9. The method of claim 1, wherein the forming the internal section of the first portion of the object within the border section includes forming a void using one of the at least one second, different melting beams.

10. A non-transitory computer readable storage medium storing code representative of an object, the object physically generated upon execution of the code by a computerized metal powder, multiple melting beam source, additive manufacturing system, the code comprising:
   code representing a first portion of the object to be built in a first overlapping field region of a plurality of melting beam sources of the additive manufacturing system, the code for the first portion including:
   a border section of the first portion of the object to be built using a first melting beam source of the plurality of melting beam sources in the first overlapping field region;
   an internal section of the first portion of the object within the border section to be built using at least one second, different melting beam source from the first melting beam source in the first overlapping field region; and
   wherein the code overlaps an entirety of an internal edge of the border section of the first portion of the object with an entirety of an external edge of the internal section of the first portion of the object.

11. The storage medium of claim 10, further comprising code for a second portion of the object to be built in a second overlapping field region of the plurality of melting beam sources, the code for the second portion including:
  a border section of the second portion of the object to be built using the first melting beam source of the plurality of melting beam sources in the second overlapping field region; and
  an internal section of the second portion of the object within the border section to be built using a third melting beam source different than the first melting beam source and the second melting beam source in the second overlapping field region.

12. The storage medium of claim 10, further comprising code for a third portion of the object to be built in a non-overlapping field region of a selected melting beam source of the plurality of melting beam sources.

* * * * *